Patented Aug. 14, 1951

2,563,996

UNITED STATES PATENT OFFICE 2,563,996

THICKENED FRUIT COMPOSITION AND METHOD OF PREPARING THE SAME

Albert C. Edgar, Palos Heights, and
Orville J. Pickens, Chicago, Ill.

No Drawing. Application February 12, 1949,
Serial No. 76,194

18 Claims. (Cl. 99—100)

This invention relates to thickened fruit compositions and to a method of preparing the same and relates especially to fruit compositions of the type adapted for use as a filling for fruit pies and the like.

In the preparation of certain types of baked goods such as fruit pies, tarts, and the like, the housewife or baker must often prepare first a relatively thick or viscous fruit filling which is introduced into a suitable pie shell and then cooked or baked in the usual manner. Thick fillings of this type are necessary in the case of such fruits as cherries and various types of berries because the individual pieces of fruit are relatively small and because a somewhat viscous custard-like or jelly-like medium is required to maintain a proper distribution of the fruit in the pie shell and to achieve a baked product having an attractive flavor and appearance. Many canned fruits are packed in a watery solution of fruit juices and sugar, and it is necessary for the housewife and baker to combine a suitable thickening agent with the canned product before using the same for baking pies or the like. Ordinarily starch or flour is employed to thicken the liquid portion of canned fruits of this type to obtain a thickened composition of satisfactory consistency for baking purposes. Other larger types of fruit, such as apples or peaches, are usually utilized for baking purposes in sliced fruit form and, although a thickened filling or vehicle for the sliced fruit has not always been considered necessary, we have found that such thickened compositions are advantageous even for sliced fruits. For example, when it is desired to utilize relatively large amounts of sugar or liquid sweetening agents as well as spices and other cooking ingredients, the sugar may be conveniently included in an aqueous prethickened filling which adheres to and coats the slices of apple or other fruit.

As mentioned above in connection with canned fruits, whenever it is desired to incorporate the valuable flavor-imparting juices of any fruit in pies and similar baked products, the juices or solution thereof must first be thickened to a semi-solid consistency in order to be retained properly in the pie shell and in order to avoid rendering the latter soggy and inedible. However, the conventional thickening methods heretofore employed as a preliminary step in the baking process do not always accomplish the required degree of thickening. Thus, in the case of berry pies, for example, a prethickened berry filling may be introduced into a pie shell and baked, but during cooking additional fruit juices or aqueous liquors exude or are discharged from the berries with resultant thinning of the pie filling and adverse effects on the taste and appearance of the pie.

It is the purpose of our invention to eliminate the step of thickening fruits or fruit juices prior to using the same in pies and similar baked goods and, furthermore, to overcome the various disadvantages incident to the use and thickening of natural and canned fruit products by the methods heretofore used.

Accordingly, a primary object of our invention is to provide a prethickened fruit composition of the type described which may be packed and sold in packaged or canned condition and is ready for use as a pie filling without further thickening.

Another object of the invention is to provide an improved canned fruit product in which the pieces of fruit are highly resistant to physical damage during handling and shipping and in which the fruit retains its flavor, color, and physical attractiveness to a much greater degree as compared with the canned fruit products heretofore available.

Still another object of the invention is to provide a novel method for canning fruit by means of which a thickened fruit product having superior flavor and physical appearance is produced.

A further object of the invention is to provide a process for preparing a heat processed thickened fruit composition of the type described in which part of the desired thickening effect is obtained during the early stages of the process but in which the final thickening action takes place only during the final heat processing stage of the process.

Other objects and advantages of the invention will become apparent from the subsequent detailed description of the invention.

We have found that, by means of certain selected thickening agents and by a preferred sequence of process steps to be described hereinafter in detail, a precooked and prethickened fruit composition or filling can be prepared which can be packed in cans and which is adapted to be utilized immediately upon opening of the can for baking pies or the like without the addition of supplementary ingredients. The thickened fruit compositions of our invention may also be prepared in frozen form by quick-freezing according to well known techniques, but, as will hereinafter appear, we prefer to can the products in order to realize the greatest benefits of the invention. Furthermore, we have found that fruits prepared according to the present invention retain to a remarkable degree their natural physical appearance and flavor when baked in pies and the like and are markedly superior in this respect to the canned fruits previously available. In many instances the canned fruit products of our invention produce more attractive and better flavored baked goods than can be obtained by the use of fresh fruits.

In general, the thickened fruit composition of our invention is prepared by compositing pretreated pieces of fruit with an aqueous solution and/or suspension containing a mixture of thickening agents, as hereinafter described, along with sugar, spices, and other ingredients as desired. According to our preferred procedure, cans containing the composition are heated to remove trapped air, sealed, and heat processed. If the freezing technique is employed, the composition is frozen directly without the intervening heat processing step. For convenience we refer to the mixture of the thickening agents as a "stabilizer" and to the aqueous solution and/or suspension containing the same as a "stabilizer solution." Similarly, we may refer to our final thickened product as a "stabilized" fruit filling or composition.

An important feature of our invention resides in the conjoint use of proportioned amounts of two different types of edible thickening agents, one of which is readily soluble in aqueous sugar solutions and the other of which is substantially less soluble and produces additional thickening only upon absorption of fruit juices exuded during subsequent heat processing or baking. We prefer to employ a combination of thickening agents so chosen and so proportioned that the more soluble thickening agent will readily dissolve during the initial preparation of the so-called stabilizer solution and the other less soluble thickening agent will be held in suspension and will dissolve to a substantial extent only during the final heat processing step of the process or during the subsequent use of the product in baking or cooking. Thus, one of the stabilizer ingredients may be said to be effective to produce thickening immediately, whereas the other ingredient may be characterized as having a latent thickening power which becomes effective at a subsequent time. In this way a partially thickened and much less viscous material is available for handling during the major portion of the process with consequent advantages in ease of operation and economy of production, and it is only during the later heat processing or baking steps that a material of desired ultimate thickness is obtained. We also contemplate the use of a sufficient quantity of the less soluble thickening agent so that it does not all dissolve even in the aforementioned heat processing step. As a result, in this embodiment of our invention, the stabilized fruit filling contains suspended particles of thickening agent which are available for thickening action when the housewife or baker employs the product in a baking operation. Thus, as previously mentioned, thickening agent is available to exert a thickening action on additional fruit juices which may be exuded during a subsequent cooking or baking step.

We have found that if, instead of employing a composite mixture of two types of thickening agents as described above, a stabilizer is used comprising only a thickening agent of the readily soluble type, which is, therefore, substantially entirely effective to produce immediate thickening to the desired final consistency, the resultant completely thickened stabilizer solution is not sufficiently fluid and is consequently quite difficult and expensive to handle during the various processing steps. On the other hand, if the stabilizer used comprises only a thickening agent of the relatively insoluble or difficultly soluble type, then the desired thickening action cannot be realized until the heat processing step and continuous agitation or stirring would be required to insure homogeneous distribution of the thickening agent throughout the stabilizer solution. Such stirring or agitation in the presence of the fruit results in physical damage to the latter. We avoid these problems by utilizing a mixture of thickening agents, one being effective immediately to produce a partially thickened but readily handled solution and the other being held in suspension in the partially thickened solution and being operative to effect final thickening only after the major portion of the transporting and handling phases of the process have been completed.

A wide variety of thickening agents may be employed, but in general we prefer to utilize a vegetable gum as the more soluble thickening agent and a substance of marine algal origin as the less soluble thickening agent. As examples of the vegetable gum thickening agents which we may employ, the following may be named: locust bean gum or carob, Indian gum, tragacanth, and karaya. In certain instances it is also possible to employ thickening agents such as gelatin and certain of the synthetic swelling agents including carboxy methyl cellulose which is a water soluble variety of methyl cellulose containing, for example, 25–30% methoxy groups. Typical thickening agents of marine algal origin which we may use include algin, Irish moss, and agar-agar. Although it is not the preferred method of practicing our invention, it is possible in certain instances to replace a portion of the vegetable gum or marine algal type thickening agents with starches. In general, the resultant product is not as desirable since the texture of the starches is somewhat grainy, and in addition they are harder to handle during production. Starches also tend to increase in thickness with age with some degree of syneresis which, however, can be avoided or retarded by using the starch in combination with a vegetable gum. If starches are used, we prefer to employ the long cell starches such as potato starch, wheat starch, arrowroot, waxy maize, and tapioca.

Our preferred stabilizer, which has been found to give good results with fruits most commonly employed, is a mixture of locust bean gum with algin, the former being present preferably in major proportion by weight. Other suitable combinations which may be used include, for example, tragacanth and algin, karaya and agar-agar, locust bean and Irish moss, karaya and algin, locust bean and agar-agar, etc. In general, the thickening agent which is most effective to produce a desired thickening action is present in the stabilizer in minor proportion with the other less potent thickening agent being present in major proportion. In most cases it happens that the most effective thickening agents are also the least soluble, and vice versa. Thus, in our preferred stabilizer comprising locust bean gum and algin, the locust bean gum is the more soluble of the two and is also of lesser thickening power, i. e. relatively larger quantities are required to produce a given degree of thickening, and algin is substantially less soluble but more effective in that only relatively small quantities are required to bring about a given degree of thickening. A mixture of 80% by weight of locust bean gum and 20% by weight of algin has been found to give excellent results in the preparation of various types of stabilized fruit fillings.

We are aware that in the prior art algin has been suggested to bring about a desired thickening action in fruit-containing sirups such as those employed in soda fountains to pour over ice cream, cake, etc. However, our invention is distinguished from such prior uses of algin by the fact that we employ a mixture of two or more different thickening agents having different degrees of solubility and thickening ability, as described above. Our invention is also distinguished by the fact that we contemplate much greater amounts of total thickening agent in the stabilizer solution than are necessary in the production of fruit sirups for fountain use. For example, whereas a fruit-containing fountain sirup need contain no more than about 0.5 weight per cent of algin as a maximum, our stabilizer solutions contain preferably from about 1.5 to about 5% of total thickening agents. Moreover, our invention is further distinguished from the fruit sirup art in that we preferably employ a heat processing or cooking step in our process, whereas in the prior art referred to above the fruit is merely added to a thickened sugar sirup without further heat processing or cooking.

Any of the commonly available sugars or sugar equivalents may be employed in preparing the stabilizer solution. For example, sucrose and dextrose are the sugars most conveniently employed for this purpose, but invert sugar and fructose may also be employed with satisfactory results.

The stabilizer solution also provides an appropriate medium or vehicle for the addition of spices or flavoring agents which may be desirable with certain types of fruits. For example, in the case of apples, it is preferred to add powdered cinnamon to the stabilizer solution.

A suitable organic acid such as citric acid or tartaric acid may also be added to the stabilizer solution in order to maintain a uniform pH. In the case of most fruits, such acid additions have been found to be desirable in order to achieve consistent quality in the final product and in order to preserve and emphasize the characteristic fruit flavor.

The thickened fruit composition and the fruit processing method of our invention are adapted for use with any variety of fruit including the canned fruits which are ordinarily employed in the preparation of baked products. For example, the following fruits may be mentioned as being particularly suitable for use in the product and process of the present invention: cherries, apples, peaches, apricots, strawberries, plums, cranberries, blueberries and grapes.

In practicing our invention, the fruit is usually prepared and pretreated by various techniques dependent upon the nature of the particular fruit involved. For example, apples or peaches are peeled, cored or pitted, and sliced, following which the thus prepared fruit may be brought up to the approximate processing temperature by means of steam when a canned product is being prepared. In the case of apples, the sliced fruit may be soaked in a brine solution for an extended period prior to steaming for the purpose of inhibiting or retarding the formation of brown spots or other natural discoloration. In the case of such fruits as cherries or berries, the fruit may first be soaked in cold water for a suitable period in order to induce firmness prior to the removal of pits and stems.

During the preparation and preheating of the fruit, the stabilizer solution may be prepared by first dissolving the desired amount of sugar in water to form an aqueous sugar solution. To this initial solution is added gradually, with continuous agitation or stirring, a dry mixture containing the stabilizer, i. e. a commingled powdered mixture of the two types of thickening agents, together with spices, organic acid, or other additives as desired, and sufficient sugar to prevent caking of the solid ingredients. This latter step is conveniently carried out in a mixing kettle at an elevated temperature below the boiling point of the sugar solution, e. g. from about 160 to about 215° F. The total stabilizer solution may contain from about 1.5% to about 5% by weight of stabilizer or combined thickening agents. Upon dissolution of the more soluble thickening agent, the aqueous sugar solution becomes partially thickened but is still fluid enough to be handled and transported easily. The less soluble thickening agent, however, is relatively ineffective at this stage and the solid particles thereof are held in substantially homogeneous suspension throughout the partially thickened composition.

The partially thickened stabilizer solution is now composited, in the desired proportion and by any suitable method, with the pretreated and preheated fruit, following which the mixture is heat processed or cooked at an elevated temperature, e. g. of the order of 150 to 200° F. During this heat processing step, the suspended particles of the less soluble thickening agent are dissolved in or absorbed by the fruit juices which exude during cooking thereby bringing about the final desired extent of thickening of the stabilizer solution. As previously pointed out, we may employ such amounts of the less soluble thickening agent and so control the heat processing step that the less soluble thickening agent is not entirely dissolved even during heat processing. Thus, the final canned product of our invention may, if desired, contain undissolved thickening agent which is thereby available for further thickening of fruit juices exuded during baking or other subsequent cooking uses of the product.

In preparing our product in canned form, the invention is not limited to any particular method of compositing the partially thickened stabilizer solution with the fruit and heat processing the mixture. However, we prefer to introduce the partially thickened solution directly into cans or other suitable containers, following which the pretreated fruit is added, trapped air is removed, the cans sealed, and heat processing of the contents of the sealed cans carried out whereby to accomplish dissolution of the less soluble thickening agent and final thickening of the product in situ. Removal of trapped air may be accomplished by heating the filled cans with steam at a temperature of from about 160 to about 200° F. or by exhausting under vacuum at substantially lower temperatures. As will be described hereinafter, the in situ heat processing technique offers major advantages because it is never necessary to handle or transport the completely thickened solution and because the fruit is cooked while held relatively firmly in suspension in the thickened filling.

Although the invention is described herein primarily in connection with a canning and heat processing technique, it is to be understood that the product may also be prepared in frozen form as hereinbefore mentioned. When freezing methods are employed, the partially thickened stabilizer solution is prepared in the same way and composited with prepared fruit in any convenient manner. This composition is then frozen without heat processing as in the canning technique. The frozen product may be utilized by the consumer in the usual way, and the less soluble thickening agent contained therein becomes effective during baking or cooking with the result that fruit juices exuded during such baking or cooking are thickened to the desired extent.

The following specific examples are presented merely for the purpose of illustrating the preferred method of practicing the invention in the case of three different types of fruits and are not intended to limit the invention to the exact materials and steps described:

Example I

A quantity of apples of a firm canning variety was peeled, cored, sliced, and held overnight in a 5% brine solution to prevent the formation of undesirable brown spots or specks on the apple slices. The following day the apples were transported by conveyor from the brine tank to a steaming box in which the apples were blanched or heated with steam to about 150° F. During the heating step, the stabilizer solution and suspension was prepared by dissolving about 15 pounds of sugar in 11 pounds of water. To this aqueous sugar solution there was added slowly with stirring in a mixing kettle at about 205° F. a dry mixture which contained about 5 pounds of sugar, 0.8 pound of locust bean gum. 0.2 pound of powdered algin, 0.1 pound of powdered cinnamon and 0.05 pound of citric acid. During the mixing of the stabilizer solution in the kettle, the locust bean gum was substantially all dissolved and the solution was thereby partially or preliminarily thickened. The algin, however, was relatively insoluble in the aqueous sugar solution and the particles were distributed in substantially homogeneous suspension in the partially thickened stabilizer solution.

The partially thickened stabilizer solution containing suspended algin particles was poured into open cans, and the heated apples were then removed from the steaming box and placed directly in the cans. The apple slices were pushed down in the cans until the stabilizer solution covered the fruit, the weight ratio of fruit to thickened liquid in the filler cans being about 2 to 1. Although this ratio may, of course, be varied somewhat, it has been found to be a satisfactory average figure for practically all fruits. The filled cans were then exhausted to remove trapped air by heating in a steam bath to an internal temperature of about 160° F. until all the inert gases and air were driven off. Following this, the cans were sealed and heat processed in boiling water to about 180 F. internal temperature in order to accomplish the necessary pasteurization.

During the heat processing or cooking of the fruit composition in the sealed cans, the apple juices were cooked out of the apple slices and, together with the aqueous sugar solution, dissolved the suspended algin particles to produce a final in situ thickening action.

Example II

Cherries of a suitable canning variety were soaked overnight in cold water in order to induce firmness. Following the soaking step, the cherries were pitted and blanched by steaming in substantially the same manner as in the case of the apples described in Example I. A stabilizer solution was prepared containing the same ingredients in the same relative quantities as described in Example I with the exception that the cinnamon was omitted. The partially thickened stabilizer solution was then poured into cans and the cherries added to obtain a mixture in the cans containing from about 50% to 80% by weight of fruit. The filled cans were then exhausted, sealed, and heat processed as described in Example I. During the heat processing or cooking step the suspended algin particles were dissolved at the relatively high cooking temperature in the cherry juices and aqueous sugar solution to produce the finally thickened composition in situ. In the case of cherries, we have found that, in addition to the numerous advantages presented by a stabilized fruit filling, the use of a stabilizer of the type described also results in a marked improvement and retention of the natural fruit color.

Example III

The process substantially as described in Example I was utilized successfully in the preparation of a canned stabilized peach filling. A good canning variety of peaches was employed, the fruit being peeled, pitted, sliced, and heated with steam prior to introduction into cans containing the partially thickened stabilizer solution. The brine treatment used in the case of the apples of Example I was omitted and, in addition, the cinnamon was also omitted from the stabilizer solution. After the peach slices were introduced into the cans to provide about a 2:1 weight ratio of fruit to stabilizer liquid therein, the cans were exhausted, sealed, and heat processed as described in Examples I and II.

The principle of our invention, namely, the utilization of a composite thickening agent comprising a combination of one agent, such as a vegetable gum which is relatively soluble to produce preliminary partial thickening, and another agent, such as a substance of marine algal origin which is only slightly soluble, results in a number of advantages and economies. In the first place, substantial savings in labor and operating costs are achieved by reason of the fact that the stabilizer solution is processed and handled for the most part while it is in only a partially thickened but reasonably fluid condition. Thus, the cans or other containers may easily be filled by conventional pouring and liquid handling methods, with the final thickening to a semi-solid consistency being obtained in situ only after the cans have been sealed. The availability of a pre-cooked and pre-thickened fruit composition or pie filling is a great advantage to the housewife and baker since it eliminates a number of preliminary operations during the preparation of pies and other baked goods. For example, it is only necessary for the housewife to prepare the pie shell following which the can of pre-thickened fruit filling may be opened and its contents introduced directly into the pie shell for baking.

In the case of certain types of canned fruits the process of our invention also offers unusual advantages in the appearance and preservation of the canned fruit product. For example, according to present methods of canning cherries, the fruit is generally cooked in water after pitting and as a result there is a marked tendency toward breaking down and general physical deterioration of the tissues and cell structure of the fruit during the cooking process. The cooked cherries often have a flabby and unattractive appearance, and a substantial portion of the flavor imparting constituents of the fruit has been extracted into the cooking liquor. According to our invention, however, the cherries are cooked while held relatively firmly in the thickened stabilizer solution with a resultant marked improvement in the physical appearance and taste of the cooked cherries. It is also believed that in some cases the presence of the more soluble and less soluble thickening agents results in a favorable balancing of osmotic pressures at all times, including the heat processing stage, with the result that shrivelling of the fruit and loss of fruit juices are markedly diminished and the fruit retains a firm and attractive appearance. Another disadvantage of the previously available canned cherry product is that the cooked cherries are packed with the relatively thin watery cherry juices thereby permitting considerable liquid agitation and a rather high degree of sloshing around in the can or jar during handling and distribution which results in further physical damage to the cherries. The canned product of our invention is not subject to this disadvantage since the pre-thickened cherry composition does not tend to move around inside of the container during handling and this source of damage is, therefore, greatly minimized.

Baking tests employing our thickened fruit compositions have shown that highly attractive baked products are obtainable since the natural fruit form has been preserved, the individual pieces of fruit are much firmer, and virtually all mixing or physical disturbance of the pieces of fruit has been eliminated with the result that the fruits are perfectly flavored and do not tend to disintegrate when the pie is baked. As has been emphasized heretofore, the use of a mixture of thickening agents is particularly advantageous where the fruit is of such a character that juices tend to exude during heating or cooking. If this condition prevails, the less soluble thickening agent is available to act upon juices exuded during the heat processing step of our process. Furthermore, if sufficient of the less soluble thickening agent is present so that a portion remains undissolved in the final product, then juices which may be exuded during subsequent baking of the filling in a pie shell or the like will also be thickened.

Although the invention has been described in detail with respect to certain specific varieties of fruits and certain specific thickening agents, it will be understood that various alternatives may be employed and various modifications of the process steps may be resorted to without departing from the scope of the invention as defined in the appended claim.

We claim:

1. A thickened fruit composition adapted for use as a filling for pies and the like, said composition comprising a mixture of pieces of fruit in a fluid thickening medium including two different edible thickening agents, one of said agents comprising a vegetable gum which is readily soluble and the other of said agents comprising a substance of marine algal origin which is substantially less soluble.

2. A thickened fruit composition adapted for use as a filling for pies and the like, said composition comprising a mixture of pieces of fruit, an aqueous sugar solution, a vegetable gum thickening agent readily soluble in said solution, and an auxiliary thickening agent of marine algal origin, said last-named thickening agent being substantially less soluble in said solution and being effective to produce substantial thickening only upon heating of the mixture to cause exudation of juices from said fruit.

3. A thickened fruit composition adapted for use as a filling for pies and the like, said composition comprising a mixture of pieces of fruit, an aqueous sugar solution, and two different edible thickening agents, one of said thickening agents comprising a vegetable gum and being readily soluble in said solution and the other of said thickening agents comprising a substance of marine algal origin and being substantially less soluble in said solution, and at least a portion of said other thickening agent being present in said composition in undissolved form whereby said portion is available to produce additional thickening of exuded fruit juices during subsequent baking of the composition.

4. A thickened fruit composition adapted for use as a filling for pies and the like, said composition comprising a mixture of pieces of fruit suspended in a thickened vehicle therefor, said vehicle comprising aqueous sugar solution and from about 1.5% to about 5% by weight of a mixture of two different edible thickening agents, one of said agents comprising a vegetable gum which is readily soluble in said solution and the other of said agents comprising a substance of marine algal origin which is substantially less soluble in said solution.

5. A thickened fruit composition adapted for use as a filling for pies and the like, said composition comprising a heat processed mixture of pieces of apple contained in a thickened medium comprising an aqueous sugar solution and a mixture of a major portion of locust bean gum as a thickening agent and a minor portion of algin as an additional thickening agent.

6. A thickened fruit composition adapted for use as a filling for pies and the like, said composition comprising a heat processed mixture of pieces of apple contained in a thickened medium comprising an aqueous sugar solution and a mixture of about 80% by weight of locust bean gum and about 20% by weight of algin.

7. A thickened fruit composition adapted for use as a filling for pies and the like, said composition comprising a heat processed mixture of pitted cherries contained in a thickened medium comprising an aqueous sugar solution, locust bean gum as a thickening agent, and algin as an additional thickening agent.

8. A thickened fruit composition adapted for use as a filling for pies and the like, said composition comprising a heat processed mixture of pieces of fruit suspended in a thickened vehicle therefor, said vehicle comprising aqueous sugar solution and from about 1.5% to about 5% by weight of a mixture of a major proportion by weight of a vegetable gum thickening agent which is readily soluble in said solution and a minor proportion by weight of an auxiliary thickening agent of marine algal origin which is substantially less soluble in said solution.

9. A thickened fruit composition adapted for use as a filling for pies and the like, said composition comprising a heat processed mixture of pieces of fruit suspended in a thickened vehicle therefor, said vehicle comprising aqueous sugar solution and from about 1.5% to about 5% by weight of a mixture of locust bean gum and algin.

10. A process for preparing a thickened fruit composition adapted for use as a filling for pies and the like, said process comprising the steps of compositing pieces of fruit with a partially thickened aqueous medium containing sugar and two different edible thickening agents, one of said agents being readily soluble in said aqueous medium whereby to effect preliminary partial thickening of the medium and the other of said agents being substantially less soluble in the aqueous medium, and subsequently heating the partially thickened aqueous medium containing said fruit whereby to cause exudation of juices from said fruit during cooking thereof and to effect thickening of said juices by said other thickening agent.

11. A process for preparing a thickened fruit composition adapted for use as a filling for pies and the like, said process comprising the steps of compositing pieces of fruit with a partially thickened aqueous sugar solution having dissolved therein a first edible thickening agent of a readily soluble type, said solution also containing in substantially undissolved form an excess of a second edible thickening agent of a less soluble type, and subsequently heating said partially thickened solution containing said fruit whereby to cause exudation of juices from said fruit and thickening thereof by a portion of said second thickening agent, the remainder of said second thickening agent being held in said composition in undissolved form and thereby being available to produce additional thickening of exuded fruit juices during subsequent baking of the composition.

12. A process for preparing a thickened fruit composition adapted for use as a filling for pies and the like, said process comprising the steps of preparing a partially thickened aqueous medium containing sugar and a mixture of two different edible thickening agents, one of said agents being readily soluble in said aqueous medium whereby to effect partial thickening thereof and the other of said agents being substantially less soluble in the aqueous medium, adding said partially thickened aqueous medium to a container, suspending pieces of fruit in said partially thickened medium in said container, sealing said container, and heating the sealed container whereby to cause exudation of juices from said fruit and thickening thereof by said other thickening agent and thereby effect final thickening of said medium in situ.

13. A process for preparing a thickened fruit composition adapted for use as a filling for pies and the like, said process comprising the steps of preparing a partially thickened aqueous medium containing sugar and a mixture of two different edible thickening agents, one of said agents being readily soluble in said aqueous medium whereby to effect partial thickening of the medium and the other of said agents being substantially less soluble in the aqueous medium, suspending pieces of fruit in said partially thickened medium, and then heating the resultant mixture whereby to effect final thickening of said medium.

14. A process for preparing a thickened fruit composition adapted for use as a filling for pies and the like, said process comprising the steps of preparing a partially thickened aqueous medium containing sugar and a mixture of two different edible thickening agents, one of said agents being relatively soluble in said aqueous medium whereby to effect immediate preliminary thickening of the medium and the other of said agents being relatively insoluble in said aqueous medium, compositing pieces of fruit with said partially thickened aqueous medium containing said other thickening agent in suspension therein, and heating the resultant mixture to an elevated temperature sufficient to cook the fruit and cause exudation of juices therefrom, said juices thereupon being thickened by said other thickening agent whereby to effect final thickening of said aqueous medium.

15. A process for preparing a thickened fruit composition adapted for use as a filling for pies and the like, said process comprising the steps of preparing a partially thickened aqueous medium containing sugar and a mixture comprising a major portion of locust bean gum and a minor portion of algin as thickening agents, said locust bean gum being readily soluble in said aqueous medium whereby to produce preliminary partial thickening of said medium, compositing pieces of fruit with said partially thickened aqueous medium, and heating the resultant mixture to cause thickening of exuded fruit juices by said algin whereby to produce final thickening of said medium.

16. A process for preparing a thickened fruit composition adapted for use as a filling for pies and the like, said process comprising the steps of preparing a partially thickened aqueous medium containing sugar, dissolved locust bean gum as a thickening agent for effecting partial thickening of the medium, and suspended undissolved algin for ultimately effecting final thickening of the medium; adding said partially thickened aqueous medium to containers; suspending preheated pieces of fruit in said partially thickened medium in said containers; removing trapped air from the filled containers and sealing the latter; and heating the sealed containers whereby to effect final thickening of said medium in situ.

17. A thickened fruit composition adapted for use as a filling for pies and the like, said composition comprising a mixture of pieces of fruit in a thickened fluid medium comprising an aqueous sugar solution, locust bean gum as a thickening agent, and algin as an additional thickening agent.

18. A process for preparing a thickened fruit composition adapted for use as a filling for pies and the like, said process comprising the steps of compositing pieces of fruit with a thickening medium containing two different edible thickening agents, one of said agents comprising a vegetable gum which is readily soluble in said medium whereby to effect preliminary partial thickening of the medium and the other of said agents comprising a substance of marine algal origin which is substantially less soluble in said medium, and subsequently heating the partially thickened medium containing said fruit whereby to effect final thickening of said medium.

ALBERT C. EDGAR.
ORVILLE J. PICKENS.

REFERENCES CITED

The following references are of record in the file of this patent:

UNITED STATES PATENTS

| Number | Name | Date |
| --- | --- | --- |
| 1,729,893 | Oliver | Oct. 1, 1929 |
| 1,946,649 | Thomas et al. | Feb. 13, 1934 |
| 2,010,880 | Near et al. | Aug. 13, 1935 |
| 2,248,289 | Thal | July 8, 1941 |
| 2,353,251 | Le Gloahec | July 11, 1944 |
| 2,427,594 | Frieden et al. | Sept. 16, 1947 |